United States Patent [19]

Morishita et al.

[11] Patent Number: 5,085,713
[45] Date of Patent: Feb. 4, 1992

[54] METHOD OF FORMING A PARTIALLY CARBURIZED STARTER OUTPUT SHAFT

[75] Inventors: Akira Morishita; Keiichi Konishi, both of Himeji, Japan

[73] Assignee: Mitsubishi Denki Kabushiki Kaisha, Tokyo, Japan

[21] Appl. No.: 382,442

[22] Filed: Jul. 20, 1989

[30] Foreign Application Priority Data

Jul. 22, 1988 [JP] Japan ................. 63-184040

[51] Int. Cl.⁵ ......................... C21D 8/22; C21D 9/30
[52] U.S. Cl. ............................. 148/12.1; 148/16.5; 148/319; 74/7 E
[58] Field of Search ............... 148/12.1, 16, 5, 319; 74/7 E

[56] References Cited

U.S. PATENT DOCUMENTS

| | | | |
|---|---|---|---|
| 2,520,334 | 8/1950 | Peters | 148/16.5 |
| 3,154,970 | 11/1964 | Gebhardt et al. | 475/901 |
| 4,173,501 | 11/1979 | Hildebrandt et al. | 148/16.5 |
| 4,590,811 | 7/1986 | Kasubuchi | 74/7 E |
| 4,604,907 | 8/1986 | Morishita et al. | 74/7 E |
| 4,776,224 | 10/1988 | Maezawa et al. | 74/7 E |

FOREIGN PATENT DOCUMENTS

| | | | |
|---|---|---|---|
| 60-165369 | 8/1985 | Japan | 148/16.5 |
| 2045285 | 10/1980 | United Kingdom | 148/165 |

*Primary Examiner*—R. Dean
*Assistant Examiner*—Margery S. Phipps
*Attorney, Agent, or Firm*—Sughrue, Mion, Zinn, Macpeak and Seas

[57] ABSTRACT

A rotary output shaft for a vehicle starter motor having a planet gear speed reducing device is formed by forging a steel blank to form a product having a shape similar to the rotary output shaft but having slightly larger outer dimensions, by subjecting a planet gear carrier portion 7c of the forged entire product to copper plating to prevent carburization, by subjecting the product to a carburizing treatment, and by finishing the locally carburized portion of the product.

1 Claim, 2 Drawing Sheets

METHOD OF FORMING A PARTIALLY CARBURIZED STARTER OUTPUT SHAFT

BACKGROUND OF THE INVENTION

1. Field of the Invention

The present invention relates to a method of forming a rotary steel output shaft for a vehicle starter motor having a planet gear speed reducing device wherein the rotary output shaft has at its one end a carrier portion for supporting planet gears and is adapted to slidably support a pinion driving device on a shaft portion of it.

2. Discussion of Background

There has been known a starter motor having a planet gear speed reducing device as shown in FIG. 2. The conventional starter motor 1 is constituted by a d.c. motor 2, a pinion driving device 6 which is slidably fitted onto a rotary steel output shaft 3 and is integrally provided with a one-way clutch device 4 and a pinion 5, a planet gear speed reducing device 7 to reduce the revolution of the armature rotary shaft 2a of the d.c. motor 2, the reduced revolution being transferred to a clutch outer member 4a of the one-way clutch device 4 through the rotary output shaft 3, an electromagnetic switch device 8 arranged at a side of the d.c. motor 2 so that the pinion driving device 6 is slidably moved on the rotary output shaft 3, and a shift lever 11 having an end engaged with a hook 9 connected to the plunger 8a of the electromagnetic switch 8 and the other end engaged with an annular member 10 attached to the one-way clutch device 4.

In the conventional starter motor 1, the planet gear speed reducing device 7 comprises a sun gear wheel 7a formed at the outer circumferential portion of the armature rotary shaft 2a of the d.c. motor 2, an internal gear wheel 7b fixed around the sun gear wheel 7a having the same center as that of the sun gear wheel 7a, and a plurality of planet gear wheels 7e which are interlocked with both the sun gear wheel 7a and the internal gear wheel 7b and which are rotatably supported by respective pins 7d fixed to a carrier portion (an arm portion) 7c through sleeve bearings 7f. The carrier portion 7c supporting the planet gear wheels 7e is formed integrally with an end of the rotary output shaft 3 as a flange perpendicular to the axis of the rotary output shaft 3. The front end portion of the armature rotary shaft 2a of the d.c. motor 2 is received in a recess 3a formed at the end portion of the armature rotary shaft 2a facing the rotary output shaft 3 so as to extend in the axial direction, through a bearing 12.

The shaft portion of the output rotary shaft 3 in the vicinity of the carrier portion 7c is supported by the boss of the internal gear wheel 7b through a bearing. The other end of the output rotary shaft 3 (i.e. the end portion at the right side in FIG. 2) is supported by a machine frame or a front bracket 13 through a bearing. A helical spline 3c is formed at the outer circumferential portion of a shaft portion 3b of the rotary output shaft 3 so as to be interlocked in its slidable range with a spline formed in the clutch outer member 4a of the one-way clutch device 4 of the pinion driving device 6 which is slidable on the shaft portion 3b of the rotary output shaft. By means of the helical spline 3c and the clutch outer member 4a, a torque of the rotary output shaft 3 reduced in its speed by the planet gear speed reducing device 7 is transferred to the clutch outer member 4a of the one-way clutch device 4, hence the torque is transferred to the clutch inner member 4c through rollers 4b, whereby the pinion 5 formed integrally with the clutch inner member 4c can be driven.

The rotary output shaft 3 in the starter motor 1 of this kind has been prepared as follows. Namely, a product having a shape similar to the rotary output shaft but having outer dimensions slightly larger than the rotary output shaft as a final product is formed by a cold forging method; the forged product is subjected to a treatment of carburization; and then the carburized product is machine-finished to obtain the rotary output shaft 3 having predetermined dimensions.

In the conventional method of manufacturing the rotary output shaft, however, much time and labor or skill are needed for finishing the carburized product having a hardened surface, which reduces processability. Namely, since finishing work for the portion having the hardened surface has to be carried out, a finishing allowance has to be very small, and grinding operation has to be carried out in its entirety of the rotary output shaft.

SUMMARY OF THE INVENTION

It is an object of the present invention to provide a method of forming a rotary output shaft for a starter motor having a planet gear speed reducing device to thereby eliminate the above-mentioned disadvantages in the conventional method.

The foregoing and other objects of the present invention have been attained by providing a method of forming a rotary output shaft for a starter motor having a planet gear speed reducing device, the rotary output shaft having at its one end a carrier portion for supporting planet gears and being adapted to transfer the revolution of the rotary output shaft reduced by the planet gear speed reducing device to a pinion driving device which is slidably supported by a shaft portion of the rotary output shaft, characterized by forging a blank to form a product having a shape similar to the rotary output shaft but having larger than outer dimensions larger than by subjecting at least the portion corresponding to the carrier portion of the forged product to a treatment for preventing carburization, by subjecting the entire product to a carburizing treatment and by finishing the locally carburized portion of the product.

BRIEF DESCRIPTION OF DRAWINGS

A more complete appreciation of the invention and many of the attendent advantages thereof will be readily obtained as the same becomes better understood by reference to the following detailed description when considered in connection with the accompanying drawings, wherein.

DETAILED DESCRIPTION OF PREFERRED EMBODIMENT

Figure 1:
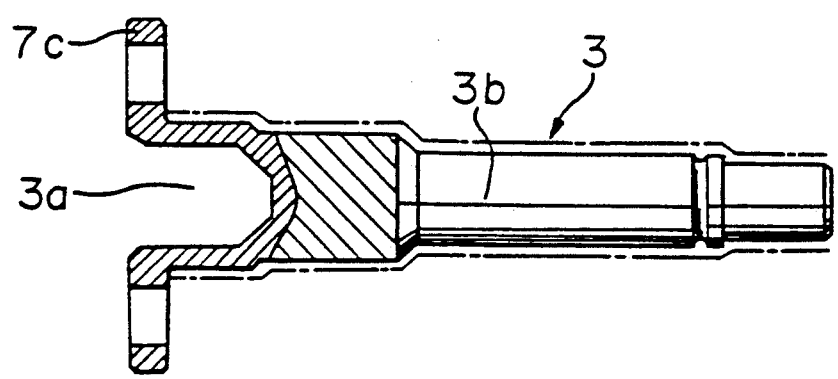
FIG. 1 is a front view partly broken of a rotary output shaft obtained by the method of the present invention.
Figure 2:
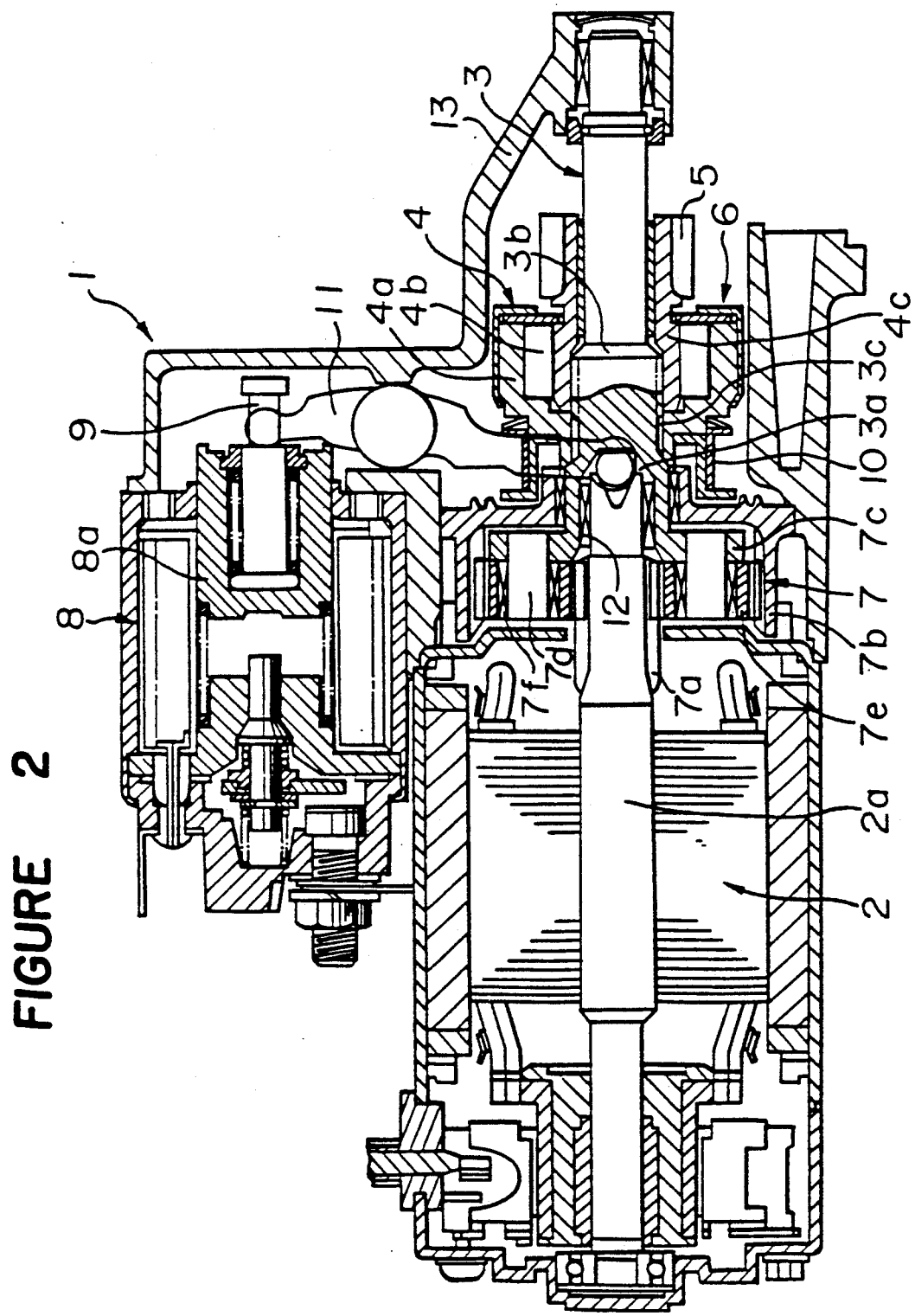
FIG. 2 is a longitudinal cross-sectional view of a typical starter motor having a planet gear speed reducing device.

Referring to the drawings, wherein the same reference numerals designate the same or corresponding parts in the several views, and more particularly to FIG. 1 thereof, there is shown a front view of an embodiment of the rotary steel output shaft 3 for a starter motor having a planet gear speed reducing device manufactured by the method of the present invention.

As an example of manufacturing the rotary output shaft 3, first, a product having a shape similar to the rotary output shaft 3 but having dimensions slightly larger than a finally produced rotary output shaft 3 is formed by using a cold forging method. Then, plating, e.g. copper plating is carried out for portions corresponding to the carrier portion 7c for supporting the planet gear wheels and the recess portion 3a for supporting an end of the armature rotary shaft of the d.c. motor through the bearing 12. Such portions are not required to have a larger strength than the shaft portion 3b. Then, the product is subjected to carburizing in its entirety, whereby only the shaft portion 3b indicated by the one-dotted chain line in FIG. 1 is hardened by carburizing. Then, only the portions corresponding to the carrier portion 7c and the recess 3a which have been subjected to the plating treatment for preventing carburization in the locally carburized product are finished by means of a lathe, a milling machine or a drilling machine so that they have predetermined dimensions. Finally, the shaft portion 3b having a surface hardened by the carburizing is finished by a grinder.

Thus, in accordance with the method of the present invention, the plating treatment for preventing carburizing is conducted on a portion which is unnecessary to have strength, such as the carrier portion and the recess portion, whereby those portions can be easily finished by a cutting or drilling machine to have predetermined dimensions. Carburizing is carried out only on portions necessary to have strength such as the shaft portion, and that portion can be finished by a grinding operation. Accordingly, work for finishing the rotary output shaft can be reduced and precessability can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A method of forming a rotary output shaft for a starter motor device having a planet gear speed reducing device, said rotary output shaft having at one end thereof a carrier portion (7c) for supporting planet gears and being adapted to transfer revolutions of the rotary output shaft reduced by the planet gear speed reducing device to a pinion driving device which is slidably supported on a shaft portion (3b) of the rotary output shaft, comprising the steps of: forging a steel blank to form a product having a shape similar to the rotary output shaft but having larger outer dimensions, subjecting at least the carrier portion of the forged product to a plating treatment for preventing carburization, subjecting the entire product to a carburizing treatment, and surface finishing a locally carburized portion of the product, wherein said locally carburized portion is surface finished by a grinder and the uncarburized plated carrier portion is finished by the cutter of a cutting machine selected from a group consisting of a lathe, a milling machine and a drilling machine, wherein said forging forms a recess (3a) surrounded by the carrier portion for accommodating an end of a motor armature shaft, and said recess is also subjected to said plating treatment, and wherein said plating is copper plating.

* * * * *